(12) United States Patent
Hu et al.

(10) Patent No.: US 9,705,927 B2
(45) Date of Patent: *Jul. 11, 2017

(54) METHOD AND APPARATUS FOR PROVIDING PRIVACY MANAGEMENT IN MACHINE-TO-MACHINE COMMUNICATIONS

(71) Applicant: AT&T INTELLECTUAL PROPERTY I, L.P., Atlanta, GA (US)

(72) Inventors: Qingmin Hu, Sammamish, WA (US); Farooq Bari, Kirkland, WA (US)

(73) Assignee: AT&T Intellectual Property I, L.P., Atlanta, GA (US)

(\*) Notice: Subject to any disclaimer, the term of this patent is extended or adjusted under 35 U.S.C. 154(b) by 0 days.

This patent is subject to a terminal disclaimer.

(21) Appl. No.: 14/840,326

(22) Filed: Aug. 31, 2015

(65) Prior Publication Data

US 2015/0373053 A1 Dec. 24, 2015

Related U.S. Application Data

(63) Continuation of application No. 13/324,660, filed on Dec. 13, 2011, now Pat. No. 9,124,632.

(51) Int. Cl.
*G06F 17/00* (2006.01)
*G06F 7/04* (2006.01)
(Continued)

(52) U.S. Cl.
CPC .......... *H04L 63/20* (2013.01); *G06F 21/6218* (2013.01); *H04W 4/005* (2013.01);
(Continued)

(58) Field of Classification Search
CPC . H04L 63/20; H04L 63/0263; H04L 63/0407; G06F 21/6218; H04W 12/02; H04W 4/005
(Continued)

(56) References Cited

U.S. PATENT DOCUMENTS 7,136,940 B2 11/2006 Roh et al.
7,747,534 B2 6/2010 Villicana et al.
(Continued)

OTHER PUBLICATIONS

Cheng et al.; Enabling Web Services Policy Negotiation with Privacy preserved using XACML; 2007; Retrieved from the Internet <URL: http://ieeexplore.ieee.org/xpls/abs_all.jsp?arnumber=4076434&tag=1>; pp. 1-10 as printed.
(Continued)

*Primary Examiner* — Aravind Moorthy

(57) ABSTRACT

A method, non-transitory computer readable medium and apparatus for processing a request from a server of a machine-to-machine service provider are provided. For example, the method receives the request from the server of the machine-to-machine service provider to communicate with a machine-to-machine device, determines whether to authorize the request based upon a policy in a privacy database, and enables communications between the server of the machine-to-machine service provider and the machine-to-machine device if the request is authorized based upon the policy.

20 Claims, 6 Drawing Sheets

(51) Int. Cl.
  *H04L 29/06* (2006.01)
  *H04L 9/32* (2006.01)
  *G06F 15/16* (2006.01)
  *H04W 4/00* (2009.01)
  *H04W 12/02* (2009.01)
  *G06F 21/62* (2013.01)

(52) U.S. Cl.
  CPC ......... *H04W 12/02* (2013.01); *H04L 63/0263* (2013.01); *H04L 63/0407* (2013.01)

(58) Field of Classification Search
  USPC .................. 726/1, 4; 713/166, 168; 709/229
  See application file for complete search history.

(56) References Cited

U.S. PATENT DOCUMENTS

| 9,124,632 B2* | 9/2015 | Hu .......................... H04L 63/20 |
| 2008/0163357 A1 | 7/2008 | Xiao |
| 2009/0287627 A1 | 11/2009 | Van Elburg |
| 2012/0044865 A1 | 2/2012 | Singh et al. |
| 2012/0221955 A1 | 8/2012 | Raleigh et al. |

OTHER PUBLICATIONS

Casassa Mont et al.; A Systemic Approach to Automate Privacy Policy Enforcement in Enterprises; 2006; Retrieved from the Internet <URL: http://link.springer.com/chapter/10.1007/11957454 7>; pp. 1-17 as printed.

Cisco IOS Firewall, Configuring IP Access Lists, Retrieved from the Internet <URL: cisco.com/en/US/products/sw/secursw/ps1018/products_tech_note09186a00800a5b9a.shtml>, pp. 1-15 as printed.

Cisco 819, Cisco 819 Integrated Services Routers data sheet, 2011, retrieved from the Internet <URL: cisco.com/en/US/prod/collateral/routers/ps10906/ps380/ps11615/data_sheet_c78-678459.pdf>, pp. 1-18 as printed.

Cisco Aims for a Go-anywhere Router, PCWorld, Aug. 23, 2011, Retrieved from the Internet <URL: pcworld.com/businesscenter/article/238629/cisco_aims_for_a_goanywhere_router.html>, pp. 1-3 as printed.

Jiang, Security Service Framework for Home Network, 2005, Retrieved from the Internet <URL: ieeexplore.ieee.org/xpls/abs_all.jsp?arnumber=1515407&tag=1>, pp. 1-6 as printed.

Cho et al., Home Gateway Operating Model using Reference Monitor for enhanced User Comfort and Privacy, 2008, Retrieved from the Internet <URL: ieeexplore.ieee.org/xpls/abs_all.jsp?arnumber=4560120&tag=1>, pp. 1-7 as printed.

Blum et al.; Application-driven Quality of Service for M2M Communications; Oct. 2011; Retrieved from the Internet <URL: ieeexplore.ieee.org/xpls/abs_all.jsp?arnumber=6081100&tag=1>; pp. 1-5 as printed.

* cited by examiner

METHOD AND APPARATUS FOR PROVIDING PRIVACY MANAGEMENT IN MACHINE-TO-MACHINE COMMUNICATIONS

This application is a continuation of U.S. patent application Ser. No. 13/324,660, filed Dec. 13, 2011, now U.S. Pat. No. 9,124,632, of which is herein incorporated by reference in its entirety.

The present disclosure relates generally to machine-to-machine communications and, more particularly, to a method and apparatus for providing privacy management for machine-to-machine communications.

BACKGROUND

Machine-to-machine (M2M) communication is gaining popularity and can be supported by various types of networks, e.g., a cellular access network. Traditionally, privacy has not been a concern for M2M communications.

SUMMARY

In one embodiment, the present disclosure provides a method for processing a request from a server of a machine-to-machine service provider. For example, the method receives the request from the server of the machine-to-machine service provider to communicate with a machine-to-machine device, determines whether to authorize the request based upon a policy in a privacy database, and enables communications between the server of the machine-to-machine service provider and the machine-to-machine device if the request is authorized based upon the policy.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory computer readable medium and apparatus for providing privacy management for machine-to-machine (M2M) communications. In one embodiment, a mechanism based upon privacy policy settings of device users and service providers is provided to protect M2M communications. Examples of M2M communications include an appliance, e.g., a refrigerator, sending a request to a grocery store to buy additional groceries, a grocery store requesting inventory data of a user's refrigerator, a meter (e.g., an energy meter, a gas meter, a water meter and the like) sending data to a utility company, a sensor (e.g., a motion sensor, a temperature sensor, an Infrared sensor, and the like) sending a communication to a security company and the like. Traditionally, privacy has not been a concern for M2M communications However, the increasing popularity of M2M devices may lead to concerns regarding privacy for M2M communications, especially some communications that may be privileged. For example, as M2M communications become more sophisticated, M2M communications may include privileged or personal information such as account numbers, credit card information, payment information, address information, telephone numbers, user preferences, user behavior patterns, and the like. In addition, M2M communications may be used to monitor user activity without permission from the user. The present disclosure resolves these privacy issues by providing privacy management for M2M communications to control which M2M service providers may access the M2M devices, when they may access the M2M devices, and how they may access the M2M devices.

Figure 1:
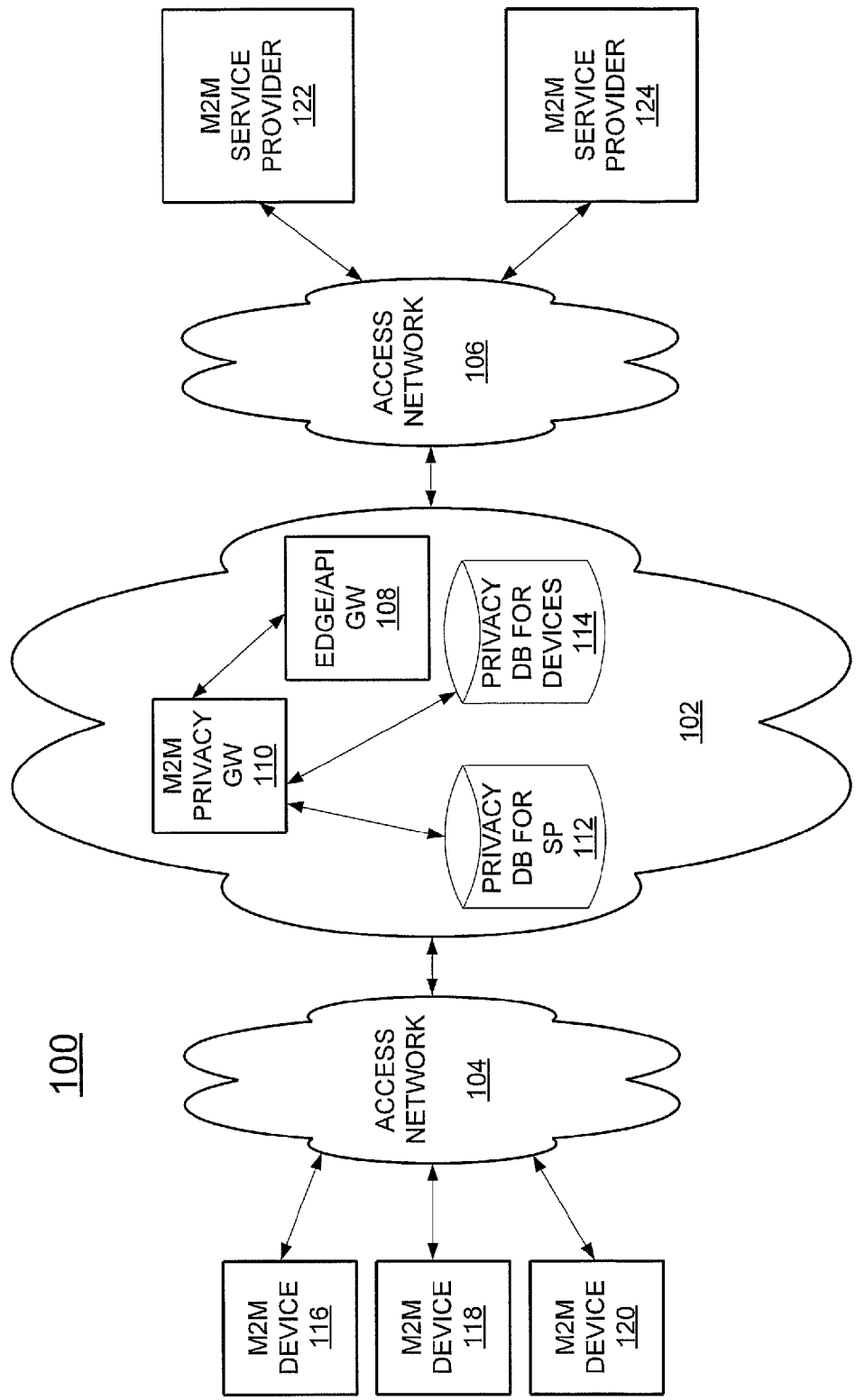
FIG. 1 illustrates one example of a high level block diagram of a communications network of the present disclosure.

FIG. 1 is a block diagram depicting one example of a communications network 100. For example, the communications network 100 may be any type of Internet Protocol (IP) network such as an IP Multimedia Subsystem or IP Multimedia Core Network Subsystem (IMS), a wired network, a wireless network, a Wi-Fi network, a cellular network, e.g., a long term evolution (LTE) network, and the like, related to the current disclosure. It should be noted that an IP network is broadly defined as a network that uses Internet Protocol to exchange data packets.

In one embodiment, the network 100 may comprise a core network 102, one or more access networks 104 and 106, one or more M2M devices 116, 118 and 120 and one or more M2M service providers 122 and 124 (having respective hardware servers (e.g., computer servers) 126, and 128 that can effect M2M communications with the M2M devices 116, 118 and 120). In one embodiment, the core network 102 may include an edge/application programming interface (API) gateway 108, a M2M privacy gateway 110, and one or more databases 112 and 114. In one embodiment, the one or more databases 112 and 114 may include a privacy database for M2M service providers 112 and a privacy database for M2M devices 114. Although FIG. 1 illustrates three M2M devices 116, 118 and 120 and two M2M service providers 122 and 124, any number of M2M devices or M2M service providers may be deployed.

In one embodiment, the edge/API gateway 108 provides an interface for allowing the M2M service providers 122 and 124 to interact with the M2M privacy gateway 110. In one embodiment, the edge/API gateway 108 sits at an edge of the core network 102. The edge/API gateway 108 may have access security functions and control access to the M2M privacy gateway 110. In other words, the M2M service providers 122 and 124 do not have direct access to the M2M privacy gateway 110. This will provide a greater security for the M2M privacy gateway 110.

In one embodiment, the M2M privacy gateway 110 controls the manner as to how the M2M service providers 122 and 124 will have access to one of the devices 116, 118 or 120. For example, requests for communications received from the M2M service provider 122 to access the M2M device 116 may be routed to the M2M privacy gateway 110 via the edge/API gateway 108. The M2M privacy gateway 110 may then check with the privacy database for M2M service providers 112 and/or the privacy database for the M2M devices 114 to determine whether the request should be granted.

In one embodiment, the edge/API gateway 108 and the M2M privacy gateway 110 may be implemented in hardware as a specialized computer server. In one embodiment, the computer server may be similar to the general purpose computer illustrated in FIG. 4 and discussed in further detail below.

In one embodiment, the privacy database for M2M service providers 112 and/or the privacy database for the M2M devices 114 may include respective policies that are referenced by the M2M privacy gateway 110 to determine whether a request from the M2M service providers 122 and/or 124 should be granted. In one embodiment, a privacy policy stored in the privacy database for M2M service providers 112 may be defined by a communications network service provider of the core network 102. In another embodiment, the privacy policy may be defined based upon parameters associated with a service level agreement negotiated between the communications network service provider and a particular M2M service provider.

In one embodiment, the communications network service provider defined privacy policy may define which M2M service providers are authorized to communicate over the communications network 100 (e.g., via predefined list of approved M2M service providers), when the M2M service provider may communicate with a M2M device, how much bandwidth is allocated to the M2M service provider for communications, what types of communications or actions may be performed by the M2M service provider, and the like.

For example, the communications network service provider may only allow M2M service providers that subscribe to services from the communications network service provider to access the communications network 100. In another example, only M2M service providers that have a particular security clearance may be authorized to access the communications network 100. In yet another example, the communications network service provider may simply predefine a list of M2M service providers that are allowed to access the communications network 100. The above are only examples and should not be considered as limiting of the present disclosure.

The communications network service provider may also set how much bandwidth will be allocated to the M2M service provider at various predetermined times. For example, the communications network service provider may provide more bandwidth during off peak hours and less bandwidth during peak hours. In one embodiment, the communications network service provider may not provide any bandwidth during certain times of the day if there is scheduled maintenance in the communications network 100. The above are only examples and should not be considered as limiting of the present disclosure.

In one embodiment, the communications network service provider may only allow the M2M service provider to obtain information from the M2M devices, but not allow the M2M service provider to upload any data to the M2M devices for security reasons. For example, the communications network service provider may define what types of communications may be exchanged. For example, the communications network service provider may specify that communications involving personal data may not be exchanged. The above are only examples and should not be considered as limiting of the present disclosure.

In one embodiment, the privacy policy defined by the communications network service provider is dynamically negotiable. In other words, the privacy policy may be modified "on the fly" for a brief time period after the privacy policy is initially defined by the communications network service provider to satisfy a temporary need of the M2M service provider. For example, during a peak shopping season, the M2M service provider 122 may request to have additional bandwidth for communications to the M2M device 122 for a temporary time frame, e.g., one week, that is outside of the privacy policy defined by the communications network service provider. If additional bandwidth is available, the communications network service provider may adjust the privacy policy to provide additional bandwidth temporarily on a dynamic basis. In one embodiment, the M2M service provider 122 may have to pay an additional fee for the change.

In one embodiment, a privacy policy stored in the privacy database for M2M devices 114 may be defined by a user of an M2M device. For example, a user of the M2M device 116 may define a privacy policy for the M2M device 116 that is stored in the privacy database for M2M devices 114.

In one embodiment, the user defined privacy policy may define which M2M service providers are authorized to communicate with the M2M device (e.g., via a predefined list of approved M2M service providers), when the M2M service provider may communicate with the M2M device, how much bandwidth is allocated to the M2M service provider for communications, what types of communications or actions may be performed by the M2M service provider, and the like.

For example, a user may only allow M2M service providers for which they are subscribed to services to access his or her M2M device(s). In other words, the user may not allow unsolicited communications from M2M service providers. In another example, the user may only allow access to his or her M2M device(s) between 6 PM and midnight while they are home so that the user may monitor the activity and communications between the M2M service provider and their M2M device. In another example, the user may limit the number of times for a predefined time period that the M2M service provider may access the M2M device. In another example, the user may only allow a certain percentage of available bandwidth to be used by a particular M2M service provider such that the M2M device may have bandwidth to access other M2M service providers or execute other tasks.

The user may define which M2M devices (e.g., each user may have a plurality of M2M devices) that the M2M service provider may have access to, what types of activities may be performed on each of the M2M devices listed, and a limit as to the allowed activities. For example, the user may specify that the M2M service provider may only request inventory data from a refrigerator, but not initiate any new orders for groceries. In another example, the user may allow the M2M service provider to only initiate new orders for perishable foods, such as milk and eggs, and limit the orders to no more than two per item. The above are only examples and should not be considered as limiting to the present disclosure.

Although two databases 112 and 114 are illustrated in FIG. 1, it should be noted that any number of databases may be deployed. In one embodiment, a single database may be deployed to store both the privacy policy defined by the communications network service provider and the privacy policy defined by the user.

In one embodiment, the M2M devices or machines 116, 118 and 120 may be any type of machine capable of communicating over the communications network 100. For example, the machines 116, 118 and 120 may be any type of smart hardware devices or appliances such a refrigerator, a freezer, a set top box, a modem, a terminal adaptor, a sensor, and the like. It should be noted that the present disclosure is not limited to any particular type of machines.

In one embodiment, the M2M service provider 122 and 124 may be any type of M2M service provider. For example, the M2M service provider 122 and 124 may be a grocery store, a utility company, a repair shop for appliances, a department store, and the like.

In one embodiment, the access networks 104 and 106 may be any type of access network such as a cellular network, an LTE network, a wireless network, a Wi-Fi network, a publicly switched telephone network (PSTN), an Internet Protocol (IP) network, and the like. The access networks 104 and 106 may be operated by the same operator or by different operators. The access networks 104 and 106 and the core network 102 may include additional network elements that are not disclosed. For example, the access networks 104 and 106 and the core network 102 may also include border elements, gateways, routers, switches, call control elements, firewalls, various application servers, and the like.

Figure 2:
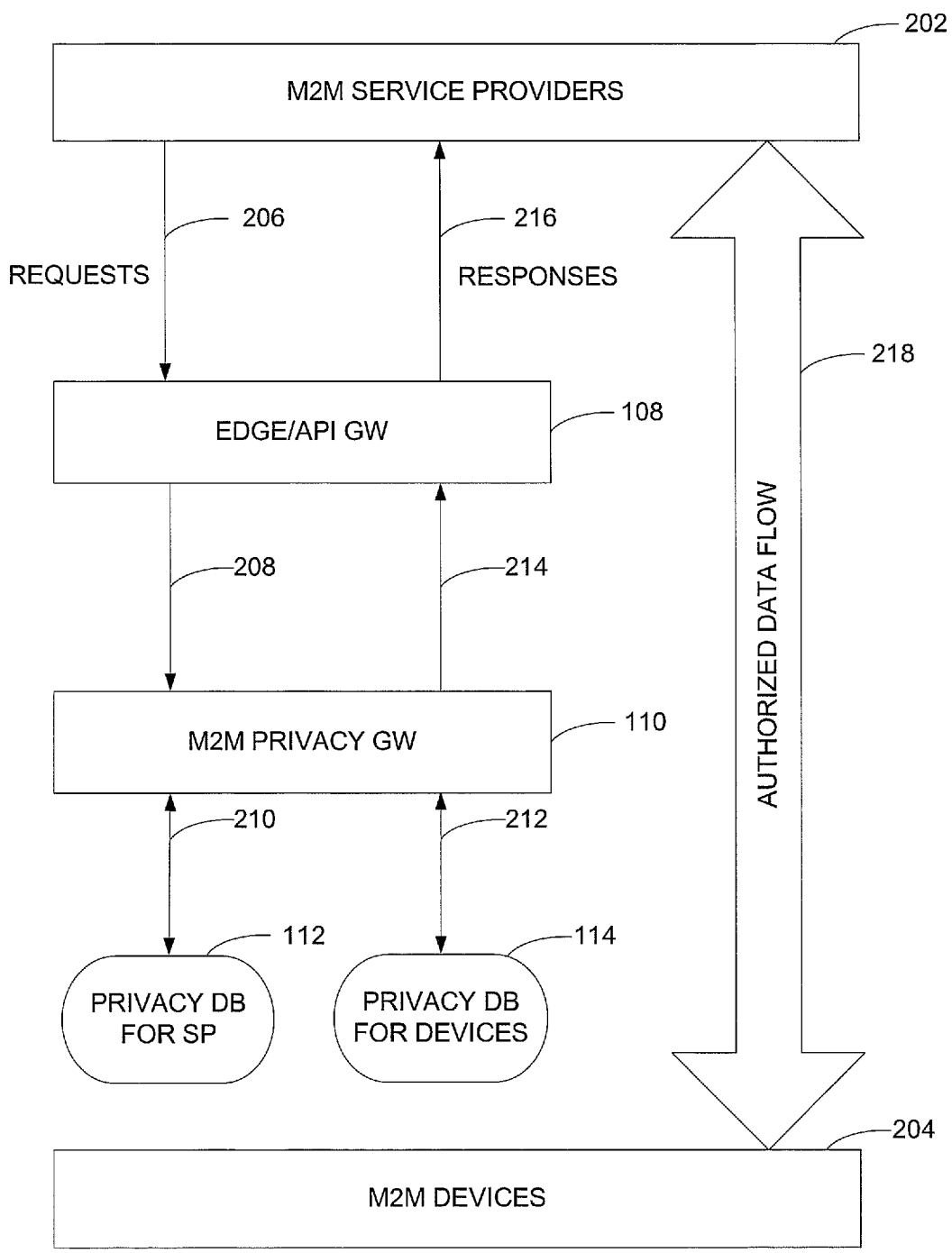
FIG. 2 illustrates a more detailed block diagram of the communications network of the present disclosure.

FIG. 2 illustrates a more detailed block diagram of a communications network 200 of the present disclosure. In one embodiment, FIG. 2 illustrates, by example, a flow of communications between M2M service providers 202, the edge/API gateway 108, the M2M privacy gateway 110, the privacy database for M2M service providers 112, the privacy database for M2M devices 114 and M2M devices 204.

The flow of communications is illustrated by arrows 206, 208, 210, 212, 214 and 216. For example, arrows 206 and 208 illustrate communications related to a request received from the M2M service providers 202 to the M2M privacy gateway 110. The arrows 214 and 216 illustrate communications related to a response to the request sent from the M2M privacy gateway 110 back to the M2M service providers 202. The arrows 210 and 212 illustrate communications between the M2M privacy gateway 110 and the privacy database for M2M service providers 112 and the privacy database for M2M devices 114, respectively.

As illustrated by FIG. 2, in one embodiment, the requests to communicate with the M2M devices 204 flow from the M2M service providers to the edge/API gateway 108. The edge/API gateway 108 may then parse the request and send a policy request to the M2M privacy gateway 110 for access permission.

Upon receiving the policy request, the M2M privacy gateway 110 may reference the privacy database for M2M service providers 112 and the privacy database for M2M devices 114 to determine if the particular M2M service provider is an authorized M2M service provider and what manner of access is allowed for that particular M2M service provider.

If the request is granted, the M2M privacy gateway 110 may then respond to the edge/API gateway 108 with detailed instructions including one or more parameters defining what type of access, how much access and when the M2M service provider may access the M2M device. Subsequently, one of the M2M service providers 202 may establish communications with one of the M2M devices 204, as represented by the two way arrow 218 for authorized data flow.

Figure 3:
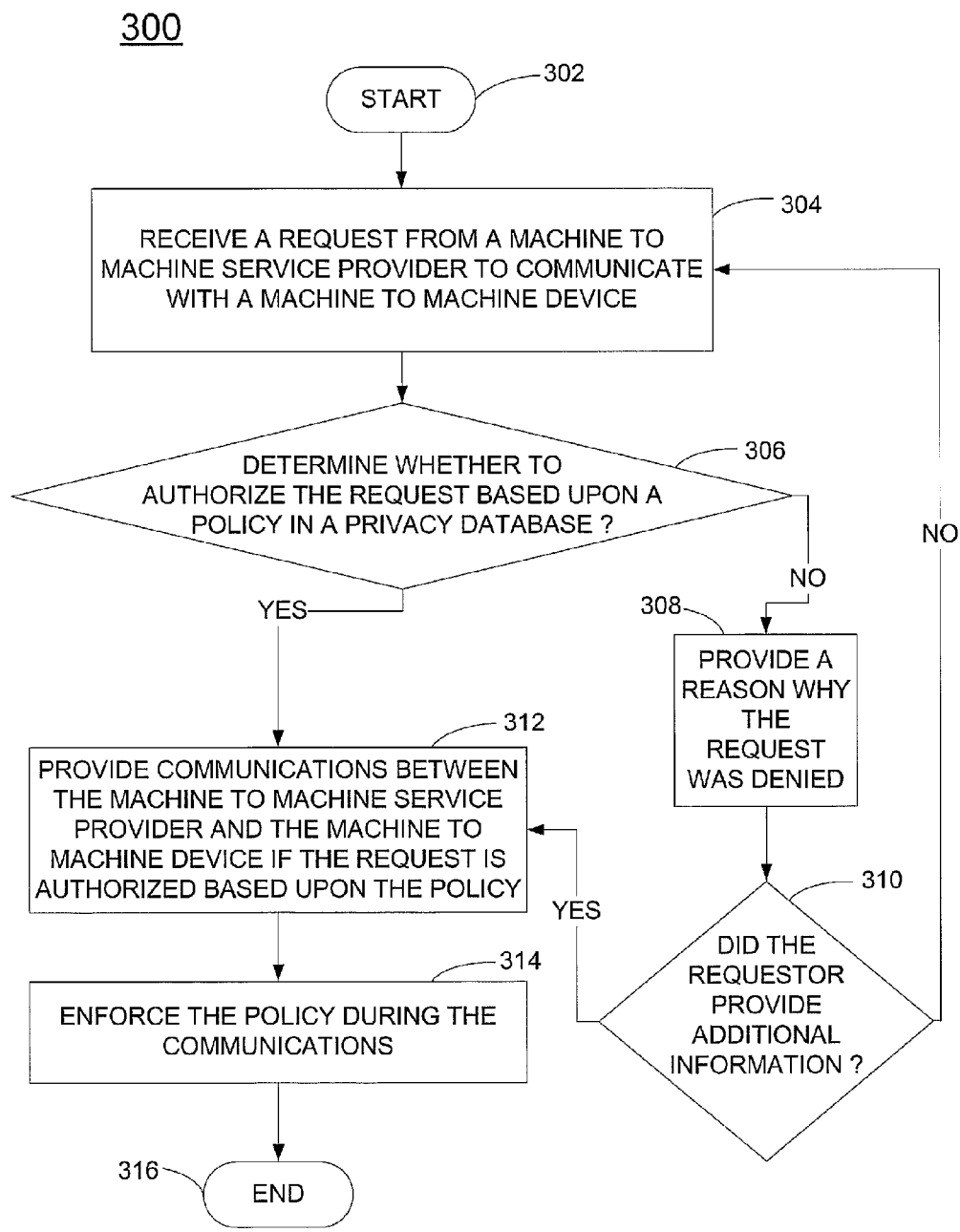
FIG. 3 illustrates an example flowchart of a method for providing privacy management for machine-to-machine communications.
Figure 6:
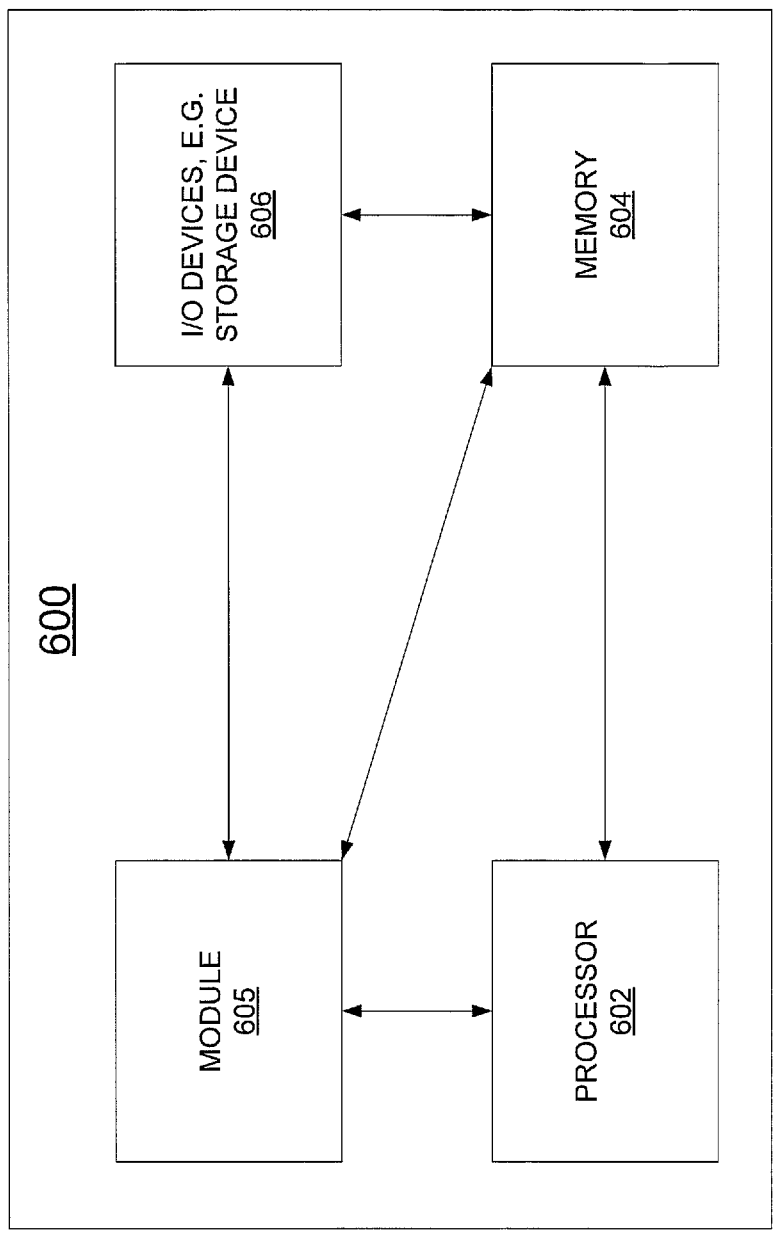
FIG. 6 illustrates a high-level block diagram of a general-purpose computer suitable for use in performing the functions described herein.

FIG. 3 illustrates a flowchart of a method 300 for providing privacy management for machine-to-machine communications. In one embodiment, the method 300 may be performed by a specialized computer server, e.g., the M2M privacy gateway 110 or a general purpose computer as illustrated in FIG. 6 and discussed below.

The method 300 begins at step 302. At step 304, the method 300 receives a request from an M2M service provider to communicate with an M2M device. For example, the request may be from a utility company to access a meter at a user's home to determine how much electricity the user has consumed.

In one embodiment, the request may be received indirectly from the M2M service provider, for example, via an edge/API gateway. Using the edge/API gateway may provide more security by preventing the M2M service provider from having direct access to the M2M privacy gateway 110.

At step 306, the method 300 determines whether to authorize the request based upon a policy in a privacy database. In one embodiment, two separate policies in two different databases may be checked to determine whether or not to authorize the request. For example, one of the privacy policies may be a communications network service provider defined privacy policy stored in a privacy database for M2M service providers. Another one of the privacy policies may be a user defined privacy policy stored in a privacy database for M2M devices.

For example, the M2M service provider may attempt to communicate with a M2M device at 2:00 AM and need a particular amount of bandwidth. The M2M privacy gateway may check the privacy policy in the privacy database for M2M service providers to find that the M2M service provider is an authorized M2M service provider and that the particular amount of bandwidth at 2:00 AM is allowed within the communications network service provider defined privacy policy.

The M2M privacy gateway may also check the privacy policy in the privacy database for M2M devices. The user defined privacy policy may allow the M2M service provider to access the M2M device associated with the user at 2:00 AM.

If the request is not authorized at step 306, the method 300 proceeds to step 308. At step 308, the method 300 provides a reason as to why the request was denied back to the requestor. The method 300 proceeds to step 310, where the method 300 determines if the requestor provided additional information. For example, additional information may be requested to rectify the reason the request was denied.

If no additional information is provided, then the method 300 may proceed back to step 304 to receive another request. If additional information was provided by the requestor that addressed the reason for the denial, then the method 300 may proceed to step 312.

Referring back to step 306, if the request is authorized, then the method 300 proceeds to step 312. At step 312, the method 300 provides or enables communications (e.g., establishing a communication session) between the M2M service provider and the M2M device if the request is authorized based upon the policy. Using the above example discussed at step 306, the request would be authorized as the request does not violate any of the privacy policies. As a result, a communications path between the M2M service provider and the M2M device may be established and the M2M service provider may be permitted to transmit and receive data from the M2M device.

At step 314, the method 300 enforces the policy during the communications. In other words, any communication or transaction between the M2M service provider and the M2M device is monitored to ensure that they are in compliance with the policy. The method 300 ends at step 316.

Figure 4:
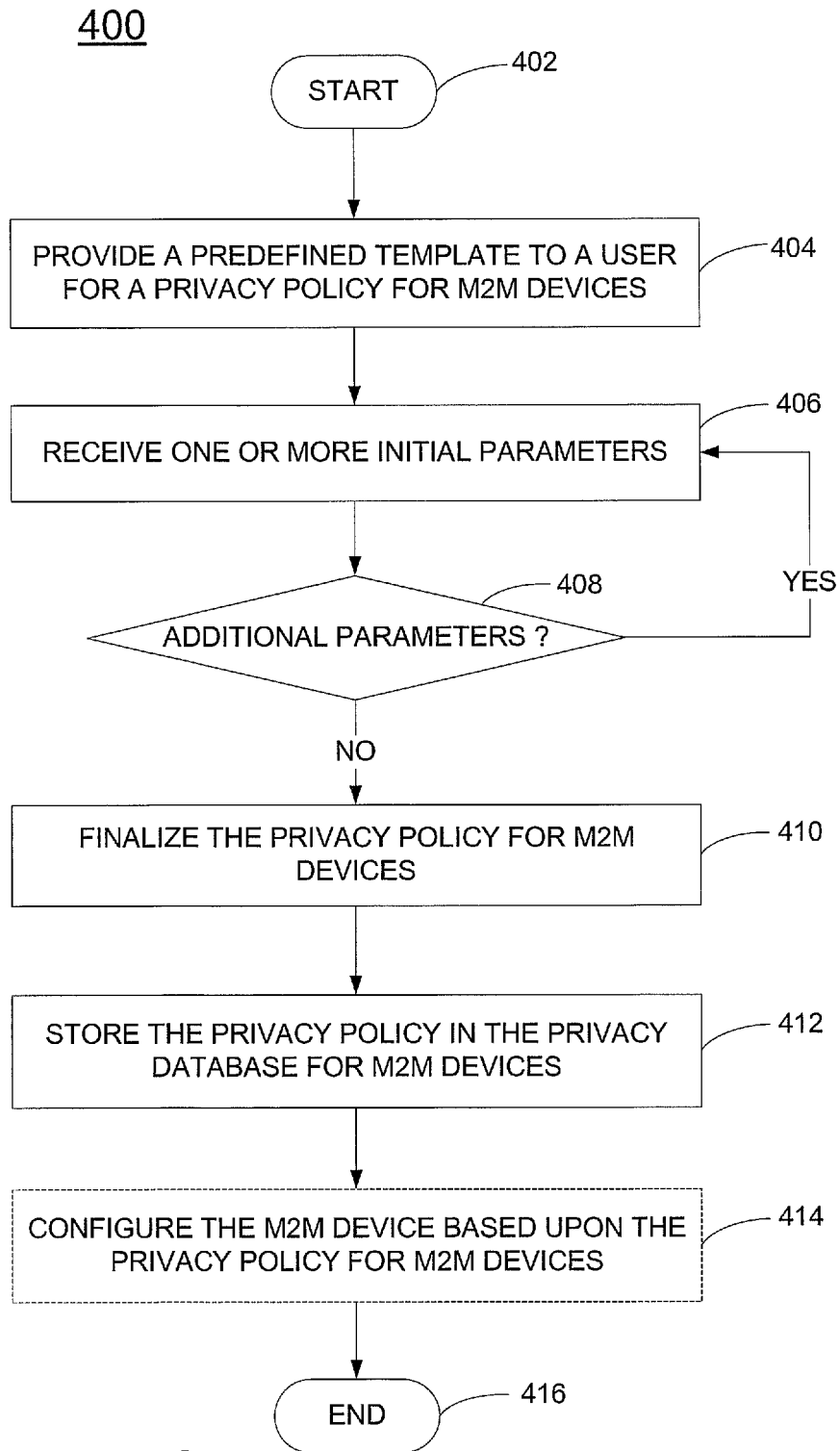
FIG. 4 illustrates an example flowchart of a method for provisioning a privacy policy for the machine-to-machine devices.

FIG. 4 illustrates a flowchart of a method 400 for provisioning a privacy policy for one or more the M2M devices. In one embodiment, the method 400 may be performed by a specialized computer server, e.g., the M2M privacy gateway 110 or a general purpose computer as illustrated in FIG. 6 and discussed below.

The method 400 begins at step 402. At step 404, the method 400 provides a predefined template to a user for a privacy policy for a M2M device. For example, the network service provider may have an initial privacy policy having default settings that show the user of the M2M device which parameters may be configured or modified. For example, some parameters may be initially populated on behalf of the user, e.g., based on government regulations and/or suggestions made by a network service provider.

At step 406, the method 400 receives one or more initial parameters. For example, the user of the M2M device may provide inputs as to how he or she would like each one of the parameters in the privacy policy to be set.

At step 408, the method 400 determines if there are additional parameters that will be received from the user. If there are additional parameters, the method goes back to step 406 to receive them from the user. If there are no additional parameters, then all of the parameters are received and the method 400 proceeds to step 410.

At step 410, the method 400 finalizes the privacy policy for the M2M device. For example, the predefined template may be modified in accordance with the received initial parameters.

At step 412, the method 400 stores the privacy policy in the privacy database for M2M device. At optional step 414, the method 400 may configure the M2M device based upon the stored privacy policy for M2M devices. The method 400 ends at step 416.

Figure 5:
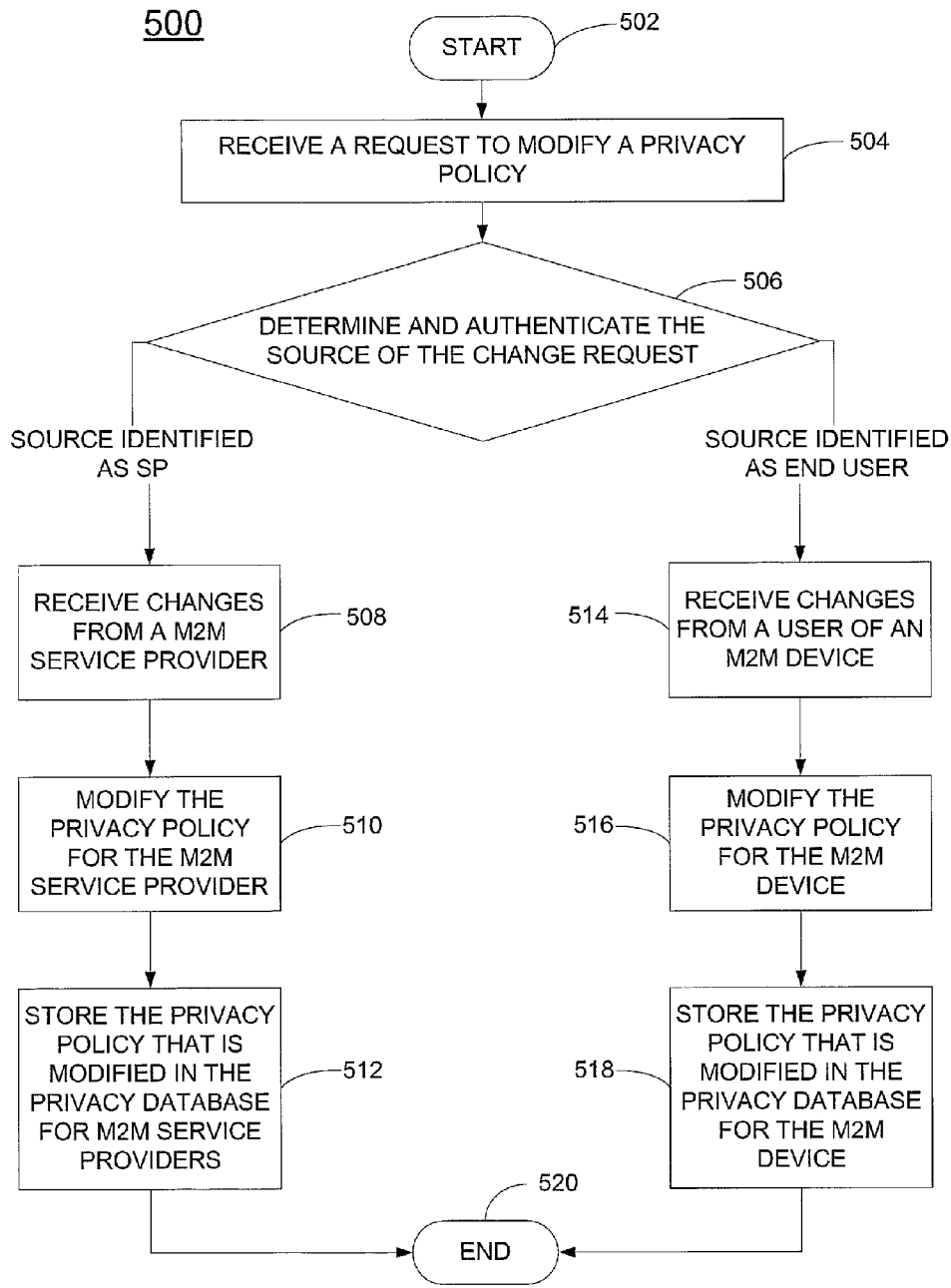
FIG. 5 illustrates an example flowchart of a method for modifying a privacy policy.

FIG. 5 illustrates a flowchart of a method 500 for modifying a privacy policy. In one embodiment, the method 500 may be performed by a specialized computer server, e.g., the M2M privacy gateway 110 or a general purpose computer as illustrated in FIG. 6 and discussed below.

The method 500 begins at step 502. At step 504, the method 500 receives a request to modify a privacy policy.

At step 506, the method 500 determines and authenticates the source of the change request. If the request is from an M2M service provider, i.e., the source is identified as an M2M service provider, the method 500 proceeds to step 508.

At step 508, the method 500 receives changes from the M2M service provider. At step 510, the method 500 modifies the privacy policy for the M2M service provider. At step 512, the method 500 stores the privacy policy that is modified in the privacy database for the M2M service provider. The method 500 ends at step 520.

Referring back to step 506, if the request is not from an M2M service provider, then the request is from the user of an M2M device, i.e., the source is identified as an end user and the method proceeds to step 514.

At step 514, the method 500 receives changes from a user of an M2M device. At step 516, the method 500 modifies the privacy policy for the M2M device. At step 518, the method 500 stores the privacy policy that is modified in the privacy database for M2M device. The method ends at step 520.

It should be noted that although not explicitly specified, one or more steps of the methods 300, 400 and 500 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIGS. 3-5 that recite a determining operation, or involve a decision, do not necessarily require that both branches of the determining operation be practiced. In other words, one of the branches of the determining operation can be deemed as an optional step.

FIG. 6 depicts a high-level block diagram of a general-purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for providing privacy management for machine-to-machine communications, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. For example, a computer-readable medium may be in communication with the processor, where the computer-readable medium having stored thereon a plurality of instructions, the plurality of instructions including instructions which, when executed by the hardware processor, cause the hardware processor to perform the methods (e.g., methods 300, 400 and 500) as disclosed above.

In one embodiment, the present module or process 405 for providing privacy management for machine-to-machine communications can be loaded into memory 604 and executed by processor 602 to implement the functions as discussed above. As such, the present methods 605 for providing privacy management for machine-to-machine communications (including associated data structures) of the present disclosure can be stored on a non-transitory (physical and tangible) computer readable storage medium, e.g., RAM memory, magnetic or optical drive or diskette and the like. For example, the processor 602 can be programmed or configured with instructions (e.g., computer readable instructions) to perform the steps of methods 300, 400 and 500.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a request from a server of a machine-to-machine service provider, the method comprising:

receiving, by a system comprising a processor in a communication network of a communication network service provider, the request from the server of the machine-to-machine service provider to communicate with a machine-to-machine device, wherein the machine-to-machine device comprises an appliance;

determining, by the system in the communication network, whether to authorize the request based upon a machine-to-machine service provider policy in a machine-to-machine service provider privacy database located in the communication network;

determining, by the system in the communication network, a manner of access that is allowed based upon a machine-to-machine device policy in a machine-to-machine device privacy database located in the communication network when the request is authorized, wherein the machine-to-machine device policy is defined by a user of the machine-to-machine device, wherein the manner of the access that is allowed is defined by the user;

sending, by the system in the communication network, a response to the server of the machine-to-machine service provider, where the response defines the manner of the access that is allowed when the request is authorized; and monitoring, by the system, communications between the server of the machine-to-machine service provider and the machine-to-machine device to determine whether the communications are in compliant with the machine-to-machine device policy.

2. The method of claim 1, wherein the request is received at a machine-to-machine privacy gateway.

3. The method of claim 1, wherein the request is routed via an application programming interface gateway.

4. The method of claim 1, wherein the machine-to-machine service provider policy associated with the machine-to-machine service provider privacy database is dynamically negotiable.

5. The method of claim 4, wherein the machine-to-machine service provider policy associated with the machine-to-machine service provider privacy database is defined by the communication network service provider.

6. The method of claim 1, wherein the response is sent when the request from the server of the machine-to-machine service provider is deemed not to violate a privacy policy.

7. The method of claim 1, wherein the response further comprises a request for additional information when the request from the server of the machine-to-machine service provider is deemed to violate a privacy policy.

8. A non-transitory computer-readable medium storing a plurality of instructions, which when executed by a processor of a system in a communication network of a communication network service provider, cause the processor to perform operations for processing a request from a server of a machine-to-machine service provider, the operations comprising:

receiving the request from the server of the machine-to-machine service provider to communicate with a machine-to-machine device, wherein the machine-to-machine device comprises an appliance;

determining whether to authorize the request based upon a machine-to-machine service provider policy in a machine-to-machine service provider privacy database located in the communication network;

determining a manner of access that is allowed based upon a machine-to-machine device policy in a machine-to-machine device privacy database located in the communication network when the request is authorized, wherein the machine-to-machine device policy is defined by a user of the machine-to-machine device, wherein the manner of the access that is allowed is defined by the user;

sending a response to the server of the machine-to-machine service provider, where the response defines the manner of the access that is allowed when the request is authorized; and monitoring communications between the server of the machine-to-machine service provider and the machine-to-machine device to determine whether the communications are in compliant with the machine-to-machine device policy.

9. The non-transitory computer-readable medium of claim 8, wherein the request is received at a machine-to-machine privacy gateway.

10. The non-transitory computer-readable medium of claim 8, wherein the request is routed via an application programming interface gateway.

11. The non-transitory computer-readable medium of claim 8, wherein the machine-to-machine service provider policy associated with the machine-to-machine service provider privacy database is dynamically negotiable.

12. The non-transitory computer-readable medium of claim 11, wherein the machine-to-machine service provider policy associated with the machine-to-machine service provider privacy database is defined by the communication network service provider.

13. The non-transitory computer-readable medium of claim 8, wherein the response is sent when the request from the server of the machine-to-machine service provider is deemed not to violate a privacy policy.

14. The non-transitory computer-readable medium of claim 8, wherein the response further comprises a request for additional information when the request from the server of the machine-to-machine service provider is deemed to violate a privacy policy.

15. An apparatus for processing a request from a server of a machine-to-machine service provider, the apparatus comprising:

a processor in a communication network of a communication network service provider; and a computer readable medium storing a plurality of instructions which, when executed by the processor, cause the processor to perform operations, the operations comprising:

receiving the request from the server of the machine-to-machine service provider to communicate with a machine-to-machine device, wherein the machine-to-machine device comprises an appliance;

determining whether to authorize the request based upon a machine-to-machine service provider policy in a machine-to-machine service provider privacy database located in the communication network;

determining a manner of access that is allowed based upon a machine-to-machine device policy in a machine-to-machine device privacy database located in the communication network when the request is authorized, wherein the machine-to-machine device policy is defined by a user of the machine-to-machine device, wherein the manner of the access that is allowed is defined by the user;

sending a response to the server of the machine-to-machine service provider, where the response defines the manner of the access that is allowed when the request is authorized; and monitoring communications between the server of the machine-to-machine service provider and the machine-to-machine device to determine whether the communications are in compliant with the machine-to-machine device policy.

16. The apparatus of claim 15, wherein the apparatus comprises a machine-to-machine privacy gateway.

17. The apparatus of claim 15, wherein the request is routed via an application programming interface gateway.

18. The apparatus of claim 15, wherein the machine-to-machine service provider policy associated with the machine-to-machine service provider privacy database is dynamically negotiable.

19. The apparatus of claim 18, wherein the machine-to-machine service provider policy associated with the machine-to-machine service provider privacy database is defined by the communication network service provider.

20. The apparatus of claim 15, wherein the response is sent when the request from the server of the machine-to-machine service provider is deemed not to violate a privacy policy.

* * * * *